US012569845B2

(12) United States Patent
Zheng et al.

(10) Patent No.: US 12,569,845 B2
(45) Date of Patent: Mar. 10, 2026

(54) GAS DETECTION MODULE AND MOBILE TERMINAL

(71) Applicants: HUAWEI TECHNOLOGIES CO., LTD., Shenzhen (CN); Fraunhofer-Gesellschaft zur FÖrderung der angewandten Forschung e.V., Munich (DE)

(72) Inventors: Liliang Zheng, Shenzhen (CN); Martin Richter, Munich (DE); Lorenz Grünerbel, Munich (DE)

(73) Assignees: Huawei Technologies Co., Ltd., Shenzhen (CN); Fraunhofer-Gesellschaft zur FÖrderung der angewandten Forschung e.V., Munich (DE)

( * ) Notice: Subject to any disclaimer, the term of this patent is extended or adjusted under 35 U.S.C. 154(b) by 600 days.

(21) Appl. No.: 18/068,315

(22) Filed: Dec. 19, 2022

(65) Prior Publication Data

US 2023/0125011 A1 Apr. 20, 2023

Related U.S. Application Data

(63) Continuation of application No. PCT/CN2021/100727, filed on Jun. 17, 2021.

(30) Foreign Application Priority Data

Jun. 17, 2020 (CN) ......................... 202021126348.2

(51) Int. Cl.
*B01L 3/00* (2006.01)

(52) U.S. Cl.
CPC ..... *B01L 3/502715* (2013.01); *B01L 3/50273* (2013.01); *B01L 2200/0689* (2013.01);
(Continued)

(58) Field of Classification Search
CPC ........... B01L 3/502715; B01L 3/50273; B01L 2200/0689; B01L 2200/18;
(Continued)

(56) References Cited

U.S. PATENT DOCUMENTS 9,927,432 B2 * 3/2018 Yamamoto ....... G01N 33/54366
2010/0229658 A1 9/2010 Glezer et al.

(Continued)

FOREIGN PATENT DOCUMENTS

CN 103808900 A 5/2014
CN 103940964 A 7/2014

(Continued)

*Primary Examiner* — Dapinder Singh

(74) *Attorney, Agent, or Firm* — Leydig, Voit & Mayer, Ltd.

(57) ABSTRACT

A gas detection module includes: a fixed seat, a gas sensor including a detection chamber, and a micro pump. The micro pump includes a pump chamber, a first communication port, and a second communication port. The first and second communication ports are in communication with the pump chamber. The gas sensor and the micro pump are arranged side by side on the fixed seat, the fixed seat is provided with a first and a second fluid port that are both in communication with the outside of the fixed seat, the first fluid port is in communication with the detection chamber, the second fluid port is in communication with the second communication port, a flow channel is further formed on the fixed seat. One end of the flow channel is in communication with the first fluid port, and the other end is in communication with the first communication port.

18 Claims, 11 Drawing Sheets

(52) U.S. Cl.
CPC ..... *B01L 2200/18* (2013.01); *B01L 2300/041* (2013.01); *B01L 2300/048* (2013.01); *B01L 2300/0663* (2013.01); *B01L 2300/0681* (2013.01); *B01L 2300/0816* (2013.01); *B01L 2300/0861* (2013.01); *B01L 2400/0433* (2013.01); *B01L 2400/0487* (2013.01); *B01L 2400/082* (2013.01)

(58) Field of Classification Search
CPC ......... B01L 2300/041; B01L 2300/048; B01L 2300/0663; B01L 2300/0681; B01L 2300/0816; B01L 2300/0861; B01L 2400/0433; B01L 2400/0487; B01L 2400/082; G01N 33/0009; G01N 1/2205; G01N 1/24; Y02A 50/20
See application file for complete search history.

(56) References Cited

U.S. PATENT DOCUMENTS

| | | | | |
|---|---|---|---|---|
| 2011/0236264 | A1* | 9/2011 | Rajagopal | B01L 3/502761 209/132 |
| 2011/0312518 | A1* | 12/2011 | Davis | B01L 3/502761 435/7.1 |
| 2014/0377099 | A1* | 12/2014 | Hsueh | F04B 49/22 417/413.2 |
| 2016/0054215 | A1* | 2/2016 | Williamson | G08B 17/117 73/28.01 |
| 2016/0258896 | A1* | 9/2016 | Uesugi | G01N 27/404 |
| 2017/0351221 | A1* | 12/2017 | Balti | G01N 33/0037 |
| 2019/0056367 | A1* | 2/2019 | Mou | G01N 33/0031 |
| 2019/0302073 | A1 | 10/2019 | Mou et al. | |
| 2019/0331558 | A1 | 10/2019 | Mou et al. | |

FOREIGN PATENT DOCUMENTS

| | | | |
|---|---|---|---|
| CN | 205538890 | U | 8/2016 |
| CN | 109425692 | A | 3/2019 |
| CN | 109425696 | A | 3/2019 |
| CN | 109425707 | A | 3/2019 |
| CN | 109690310 | A | 4/2019 |
| JP | 2019045497 | A | 3/2019 |
| JP | 2019518955 | A | 7/2019 |

* cited by examiner

GAS DETECTION MODULE AND MOBILE TERMINAL

CROSS-REFERENCE TO RELATED APPLICATIONS

This application is a continuation of International Application No. PCT/CN2021/100727, filed on Jun. 17, 2021, which claims priority to Chinese Patent Application No. 202021126348.2, filed on Jun. 17, 2020. The disclosures of the aforementioned applications are hereby incorporated by reference in their entireties.

FIELD

This application relates to the field of gas detection technologies of mobile terminals, and in particular, to a gas detection module and a mobile terminal.

BACKGROUND

With the development of mobile terminals such as a mobile phone, a tablet computer, and a wearable device, people want to detect a gas component, a gas concentration, an odor map, and the like by using the mobile terminal. A detected object includes not only ambient air but also exhaled gas.

FIG. 1 shows a gas detection module mounted in a mobile terminal in the conventional technology. A working principle of the gas detection module is as follows: When a piezoelectric film 05 of a micro pump 04 is loaded with a first electrical signal, the piezoelectric film 05 moves in a direction P1 of FIG. 1, and a volume of a pump chamber 06 increases to form a negative pressure, so that external gas successively flows through a gas inlet and outlet 01 and a gas channel 02 and is sucked into a detection chamber of a gas sensor 03, and then the sucked gas is detected. When the piezoelectric film 05 is loaded with a second electrical signal, the piezoelectric film 05 moves in a direction P2 of FIG. 1, and the volume of the pump chamber 06 is reduced, so that the gas in the detection chamber of the gas sensor 03 is discharged through the gas channel 02 and the gas inlet and outlet 01 in sequence.

To ensure detection accuracy of the gas detection module, the volume of the pump chamber 06 may be designed to be relatively large, so that when the piezoelectric film 05 moves in the direction P2 of FIG. 1, the gas in the detection chamber of the gas sensor can be fully discharged, to avoid a phenomenon that the gas in the detection chamber of the gas sensor cannot be fully exhausted, affecting the detection accuracy. However, this may result in a relatively large volume of the entire gas detection module, which cannot meet a requirement of a miniaturization design.

SUMMARY

Embodiments of this application provide a gas detection module and a mobile terminal, and are mainly for providing a gas detection module with a relatively small volume on the premise of reducing impact on detection accuracy.

To achieve the foregoing, the following technical solutions are used in the embodiments of this application.

According to an aspect, this application provides a gas detection module, and the gas detection module includes: a fixed seat, a gas sensor, and a micro pump. The gas sensor has a detection chamber, and the micro pump has a pump chamber and a first communication port and a second communication port that are in communication with the pump chamber; and the gas sensor and the micro pump are arranged side by side on the fixed seat, the fixed seat is provided with a first fluid port and a second fluid port that are both in communication with the outside of the fixed seat, the first fluid port is in communication with the detection chamber, the second fluid port is in communication with the second communication port, a flow channel is further formed on the fixed seat, one end of the flow channel is in communication with the first fluid port, and the other end thereof is in communication with the first communication port.

According to the gas detection module provided in this embodiment of this application, the gas sensor and the micro pump are integrated on the fixed seat, and the fixed seat is provided with the first fluid port and the second fluid port that are both in communication with the outside of the fixed seat. In other words, when the first fluid port is a gas inlet and the second fluid port is a gas outlet, that is, the gas inlet and the gas outlet are two independent ports, under the action of the micro pump, external gas flows through the gas inlet and enters the detection chamber of the gas sensor, so that the gas sensor detects the gas. In addition, the gas outlet also discharges original gas in the gas detection module. Compared with a technical solution in the conventional technology in which the gas inlet and the gas outlet share one port, the gas in the detection chamber of the gas sensor can be discharged fully without designing the pump chamber of the micro pump to be relatively large. Therefore, in this application, a volume of the gas detection module is relatively small without reducing impact on the detection accuracy. In addition, the gas sensor and the micro pump are integrated on the fixed seat, and the first fluid port, the second fluid port, and the flow channel are formed on the fixed seat. Compared with a gas pipe or another flow directing structure for introducing and discharging gas, the gas detection module in this application has a more compact structure, a miniaturization design is more easily implemented, and mounting is convenient, thereby reducing mounting process difficulty.

In a possible implementation of the first aspect, a volume of the flow channel between the first fluid port and the first communication port is $Vs_1$, and $$Vs_1 \leq \frac{Vm}{Fg},$$

where Vm is a flow rate of the micro pump, and Fg is a detection frequency of the gas sensor. That is, when the first fluid port is the gas inlet, and the second fluid port is the gas outlet, that is, the gas sensor is located upstream and the micro pump is located downstream, when the gas sensor performs detection once, gas in the detection chamber of the gas sensor may be replaced at least once. In this way, a better detection effect can be achieved and the detection accuracy can be improved only when the flow rate of the micro pump, the detection frequency of the gas sensor, and the volume of the flow channel between the first fluid port and the first communication port meet the formula.

In a possible implementation of the first aspect, a sum of a volume between the second fluid port and the second communication port, a volume of the pump chamber, and a volume of a flow channel between the first communication port and an inlet of the detection chamber of the gas sensor is $Vs_2$, and $$Vs_2 \leq \frac{Vm}{Fg},$$

where Vm is the flow rate of the micro pump, and Fg is the detection frequency of the gas sensor. That is, when the second fluid port is the gas inlet, and the first fluid port is the gas outlet, that is, the micro pump is located upstream and the gas sensor is located downstream, when the gas sensor performs detection once, the gas in the detection chamber of the gas sensor may be replaced at least once. In this way, a better detection effect can be achieved and the detection accuracy can be improved only when the flow rate of the micro pump, the detection frequency of the gas sensor, and $Vs_2$ meet the formula.

In a possible implementation of the first aspect, a mounting chamber is formed in the fixed seat, the gas sensor is located in the mounting chamber, positions at which the gas sensor is in contact with the mounting chamber are hermetically connected, the mounting chamber is in communication with the first fluid port, and the flow channel is in communication with the mounting chamber. The gas sensor is disposed in the mounting chamber and is hermetically connected to the mounting chamber, so that detection efficiency can be improved, and a phenomenon of gas leakage can be avoided. In addition, the flow channel is in communication with the mounting chamber, so that the flow channel can be in communication with the first fluid port.

In a possible implementation of the first aspect, a gas-permeable filtering element is disposed in the first fluid port and/or the second fluid port, and the gas-permeable filtering element is configured to filter liquid in gas sucked into the first fluid port or the second fluid port. The gas-permeable filtering element can allow the gas to pass through, but can prevent the liquid from passing through. Therefore, the liquid can be effectively prevented from entering the detection chamber of the gas sensor to affect the detection accuracy by disposing the gas-permeable filtering element to affect the detection accuracy. In addition, when the gas is diffused, the gas may evenly flow into the detection chamber of the gas sensor through the gas-permeable filtering element, to improve stability of gas detection.

In a possible implementation of the first aspect, the gas detection module further includes a circuit board, configured to be electrically connected to a main control board in a mobile terminal, where the circuit board is disposed on one side of the gas sensor, and the circuit board is electrically connected to the gas sensor and is electrically connected to the micro pump. The circuit board is disposed and both the gas sensor and the micro pump are electrically connected to the circuit board, so that signals of the gas sensor and the micro pump are transmitted to the main control board. In this way, the circuit board, the fixed seat, the gas sensor, and the micro pump form one module. During an exemplary mounting, it is convenient to mount, and assembly efficiency is improved. In addition, a reason why the circuit board is disposed on one side of the gas sensor but not on one side of the micro pump is that the micro pump includes a vibration exciting plate that can vibrate, and when being mounted on one side of the micro pump, the circuit board may interfere with the vibration exciting plate. Therefore, in this embodiment of this application, the circuit board is disposed on one side of the gas sensor.

In a possible implementation of the first aspect, the fixed seat has a side wall opposite to a gas inlet of the detection chamber, the first fluid port is provided on the side wall, a reservoir chamber that is in communication with the first fluid port is formed on a wall surface that is of the side wall and that is opposite to the gas inlet of the detection chamber, and the reservoir chamber is in communication with the detection chamber. When the gas detection module is applied to a static detection scenario, that is, after the micro pump is turned on for a period of time, gas in the detection chamber of the gas sensor is discharged, and the detection chamber is filled with external gas, the micro pump is turned off. When the gas sensor performs detection, detected gas can be stored in the reservoir chamber by disposing the reservoir chamber, thereby improving the detection efficiency.

In a possible implementation of the first aspect, the micro pump is a unidirectional micro pump or a bidirectional micro pump. When the bidirectional micro pump is used, that is, in some application scenarios, when the first communication port is the gas inlet and the second communication port is the gas outlet, the first fluid port is the gas inlet and the second fluid port is the gas outlet. In some other application scenarios, when the second communication port is the gas inlet and the first communication port is the gas outlet, the second fluid port is the gas inlet and the first fluid port is the gas outlet. The advantage of this design is that a flow direction of gas can be changed, to prevent a gas channel between the first fluid port and the second fluid port from being blocked, thereby improving use performance of the gas detection module. In addition, the gas detection module can be applied to different scenarios.

In a possible implementation of the first aspect, the fixed seat includes a bottom board and a separation board. The bottom board has a first surface and a second surface that are opposite to each other; and the separation board is disposed at the middle of the first surface, so that the bottom board forms a first side located on one side of the separation board and a second side located on the other side of the separation board, where the first fluid port is provided on the first side, the second fluid port is provided on the second side, the flow channel is provided on the first surface and extends from the first side to the second side, the gas sensor is disposed on the first side, and the micro pump is disposed on the second side. The fixed seat has a simple and compact structure and occupies a small space.

In a possible implementation of the first aspect, the fixed seat further includes an enclosure board. The enclosure board is disposed on the first side and encloses the mounting chamber with the separation board, where the gas sensor is disposed in the mounting chamber and the positions at which the gas sensor is in contact with the mounting chamber are all connected by using a sealant layer, the mounting chamber is in communication with the first fluid port, and an end portion of the flow channel extending to the first side is in communication with the mounting chamber. The gas sensor is disposed in the mounting chamber and is hermetically connected to the mounting chamber, so that the detection efficiency can be improved, and the phenomenon of gas leakage can be avoided.

In a possible implementation of the first aspect, the micro pump includes a vibration exciting plate, the vibration exciting plate is capable of vibrating when an electrical signal is loaded to the vibration exciting plate, the vibration exciting plate is located on one side of the micro pump away from the first surface, and the enclosure board and a surface of the separation board away from the first surface are higher than a surface of the vibration exciting plate. In some embodiments, the enclosure board and the surface of the separation board away from the first surface are slightly higher than the surface of the vibration exciting plate. Because a vibration amplitude of the vibration exciting plate is small, the enclosure board and the surface of the separation board away from the first surface being slightly higher than the surface of the vibration exciting plate reserves a space for the vibration exciting plate to vibrate, thereby avoiding interference between another structure and the vibration exciting plate.

In a possible implementation of the first aspect, a fluid groove is formed on the first surface of the second side, the fluid groove extends to an outer edge of the second side, and the fluid groove forms the second fluid port. The fluid groove is provided on the first surface of the second side, so that the fluid groove forms the second fluid port, the structure and a manufacturing process are simple, and the second fluid port is easy to implement.

In a possible implementation of the first aspect, the gas detection module further includes: a control module and a drive chip, and the control module is electrically connected to the gas sensor; and the drive chip is electrically connected to the micro pump and is configured to load an electrical signal to the vibration exciting plate of the micro pump, and the drive chip is electrically connected to the control module. The control module controls the drive chip to control the electrical signal loaded on the vibration exciting plate of the micro pump, changes the loaded electrical signal to change a working frequency and the flow rate of the micro pump, and controls a frequency of the gas sensor to change the frequency of the gas sensor, so that the gas detection module is applied to different scenarios.

In a possible implementation of the first aspect, the fixed seat is made of a metal material. Less impurity gas is released by the fixed seat made of the metal material compared with a plastic material or the like, so that the detection accuracy of the gas detection module can be improved.

In a possible implementation of the first aspect, the micro pump is fixed on the fixed seat by using the sealant layer. The micro pump is fixed by using the sealant layer. Sealing performance of a welding structure for fixing the micro pump is poorer than that of the sealant layer, which affects sealing performance of the entire gas detection module and further affects the detection accuracy. In addition, when the micro pump is fixed to the fixed seat by using the welding structure, a welding process temperature is relatively high, and because the entire gas detection module has a small size and a compact structure, the relatively high process temperature causes damage to the gas sensor and the micro pump.

According to another aspect, this application provides a mobile terminal, where the mobile terminal includes a housing and the gas detection module in the first aspect or any implementation of the first aspect, the gas detection module is disposed in the housing, a first gas hole and/or a second gas hole are/is provided on the housing, the first gas hole is in communication with the first fluid port, and the second gas hole is in communication with the second fluid port.

In the mobile terminal provided in this application, because the gas detection module uses the gas detection module in any implementation of the first aspect, the first fluid port and the second fluid port that are independent of each other are provided on a fixed seat of the gas detection module. Compared with the technical solution in the conventional technology in which the gas inlet and the gas outlet share one port, the gas in the detection chamber of the gas sensor can be fully discharged without designing a relatively large suction stroke and exhaust stroke of the micro pump, that is, the volume of the pump chamber of the micro pump may not be relatively large. The gas detection module has a relatively small volume without reducing impact on the detection accuracy, so that the gas detection module occupies a relatively small mounting space in the housing.

In a possible implementation of the second aspect, the first gas hole and/or the second gas hole are/is a microphone hole provided on the housing. By using the microphone hole as the gas hole, a quantity of gas holes on the housing can be reduced and an aesthetic appearance can be improved.

REFERENCE NUMERALS

01—gas inlet and outlet; 02—gas channel; 03—gas sensor; 04—micro pump; 05—piezoelectric film; 06—pump chamber; A—mobile terminal; A1—housing; A2—gas detection module; A3—gas hole; 1—fixed seat; 101—first fluid port; 102—second fluid port; 103—flow channel; 104—mounting chamber; 105—reservoir chamber; 11—bottom board; 12—separation board; 13—enclosure board; F1—first surface; F2—second surface; K1—first opening groove; K2—second opening groove; 2—gas sensor; 3—micro pump; 301—pump chamber; 302—first communication port; 303—second communication port; 304—vibration exciting plate; 4—gas-permeable filtering element; 5—control module; 6—drive chip; 7—circuit board; 8—signal line; and 9—multimedia application.

DESCRIPTION OF EMBODIMENTS

Embodiments of this application relate to a gas detection module and a mobile terminal. The following describes the gas detection module and the mobile terminal in detail with reference to the accompanying drawings.

Figure 1:
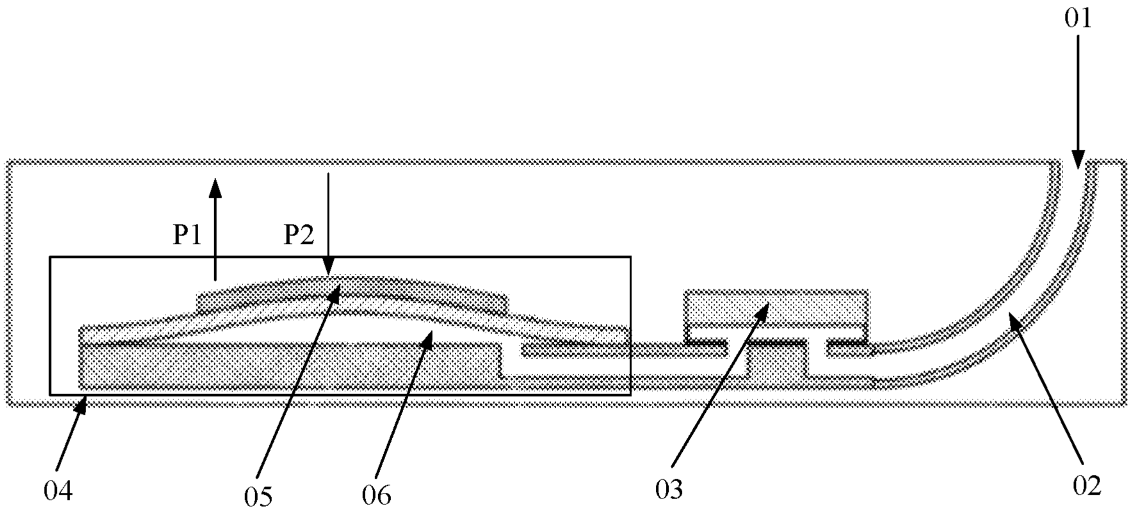
FIG. 1 is schematic diagram of a structure of a gas detection module.
Figure 2:
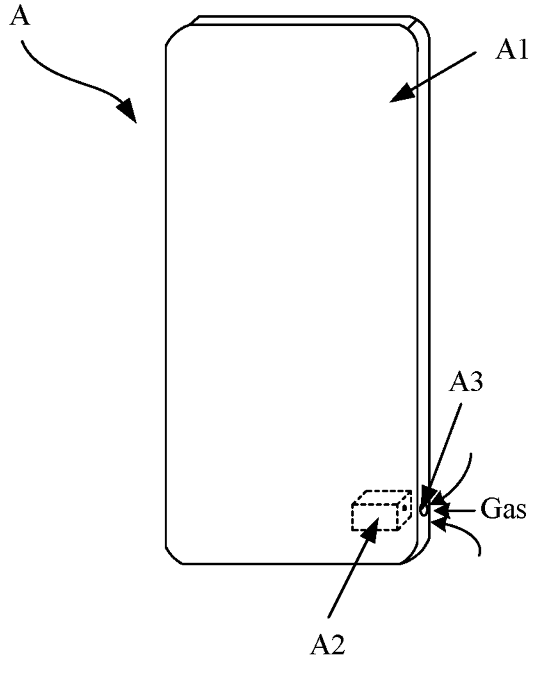
FIG. 2 is a schematic diagram of a structure of a mobile terminal having a gas detection module according to an embodiment of this application.

An embodiment of this application provides a mobile terminal. Referring to FIG. 2, the mobile terminal A includes a housing A1 and a gas detection module A2 disposed in the housing A1. The gas detection module A2 can detect a component or a concentration of ambient air, or can detect a component or a concentration of exhaled gas, or detect an odor map of other detected substances (a chromatography with an exemplary characteristic formed by a plurality of gas components and concentrations, for example, a radar map or a bar map). Therefore, the mobile terminal has a gas detection function, to improve user experience of the mobile terminal.

It should be noted that, the mobile terminal in this application may be a mobile phone, a tablet computer, a wearable device, an in-vehicle system, an augmented reality (AR) device, a virtual reality (VR) device, or the like. The exemplary type of the mobile terminal is not limited in this embodiment of this application.

For example, the mobile terminal provided in this embodiment of this application may be configured to detect a concentration of indoor air, for example, to detect whether formaldehyde reaches a standard.

For another example, the mobile terminal provided in this embodiment of this application may be configured to detect a concentration of outdoor air, for example, to detect whether PM2.5 reaches a standard, where PM2.5 refers to a particulate matter with an aerodynamic equivalent diameter less than or equal to 2.5 microns in the atmosphere.

For another example, the mobile terminal provided in this embodiment of this application may be configured to detect a component of gas exhaled by a person, to determine whether a component exists, and further detect and identify whether a user has a disease.

For another example, the mobile terminal provided in this embodiment of this application may be configured to detect a component of gas released by an article (for example, an infant crawling pad or an infant toy), to determine whether the article can be used.

For another example, the mobile terminal provided in this embodiment of this application may be configured to detect volatile gas components of wine, to determine an odor map.

It can be learned from the foregoing listed examples that the mobile terminal having the gas detection module can bring great convenience for the user, thereby effectively improving user experience of the mobile terminal.

With the development of mobile terminals, a miniaturization design and functional diversification are the development tendency, resulting in a small mounting space reserved for the gas detection module. Therefore, the present disclosure describes a gas detection module with a compact structure, a small occupied volume, and no reduction in detection accuracy.

On the premise of reducing impact on the detection accuracy, an embodiment of this application provides a gas detection module with a relatively small volume and a compact structure. In this way, the gas detection module occupies a relatively small space in the mobile terminal. Especially for an increasingly miniaturized mobile terminal, the gas detection module is more applicable.

Figure 3:
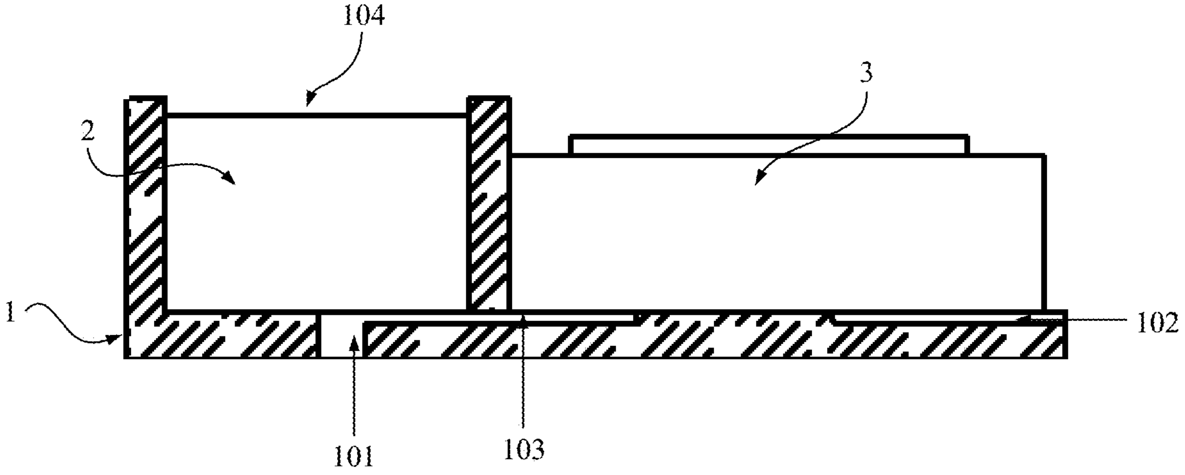
FIG. 3 is a schematic diagram of a structure of a gas detection module according to an embodiment of this application.
Figure 4:
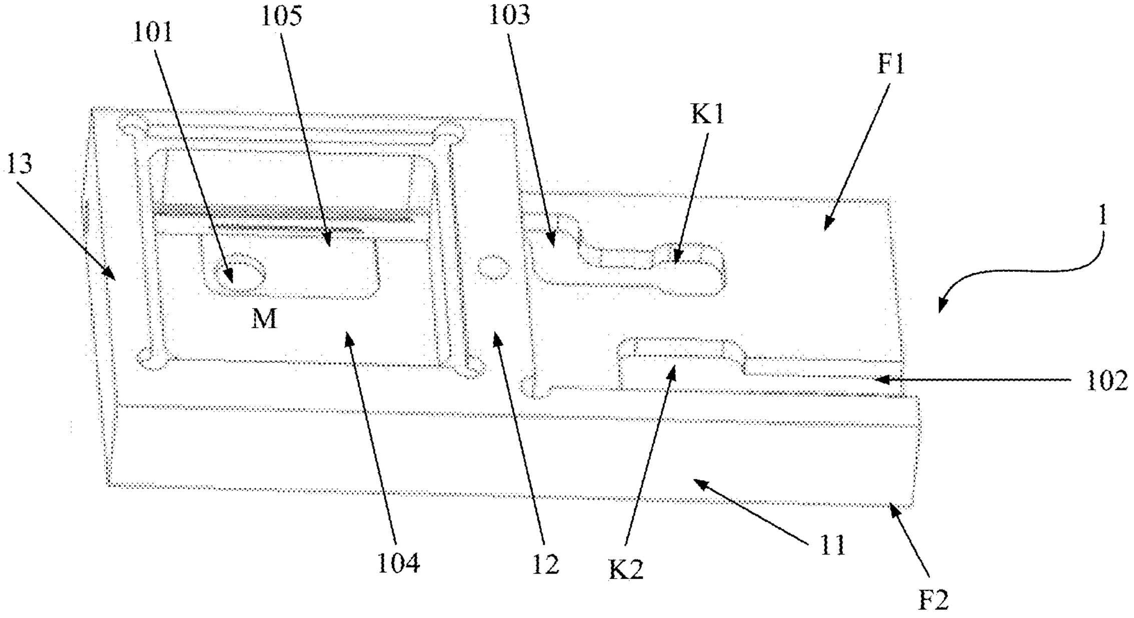
FIG. 4 is a schematic diagram of a structure of an NFC antenna according to an embodiment of this application.
Figure 5:
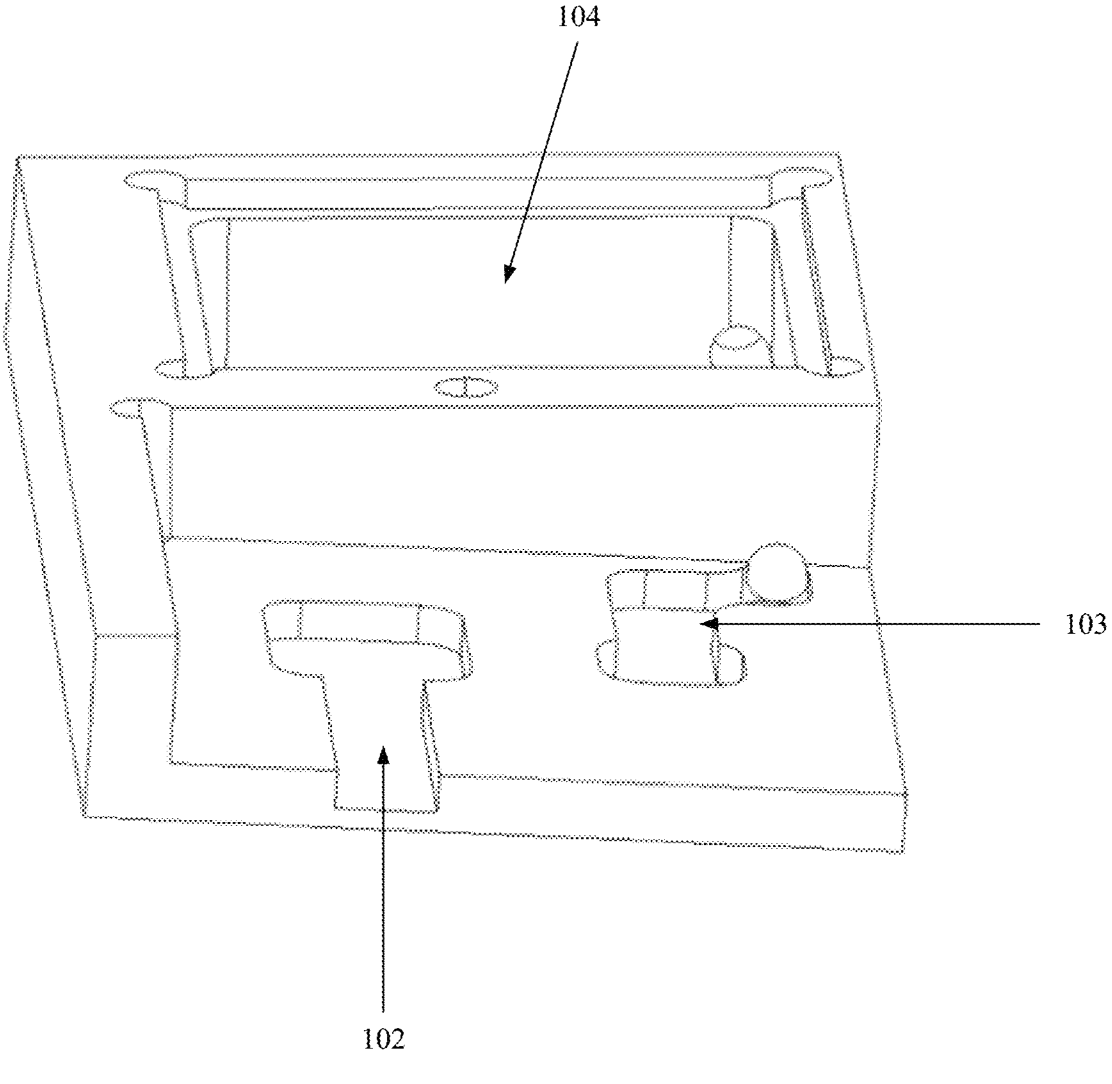
FIG. 5 is diagram of FIG. 4 from another view according to an embodiment of this application.
Figure 6A:
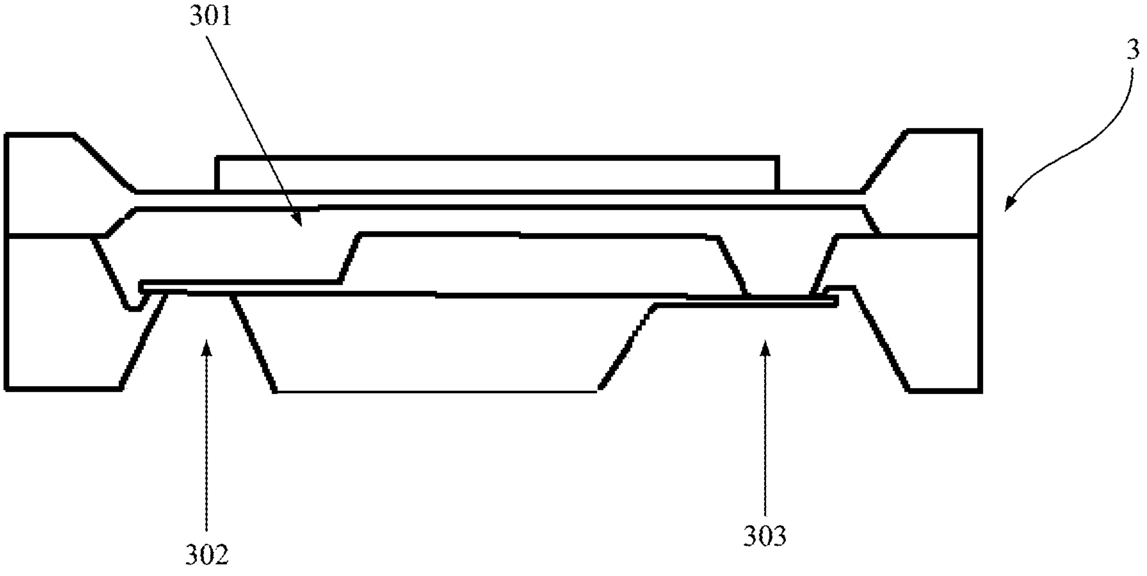
FIG. 6*a* is a schematic diagram of a structure in which both a first communication port and a second communication port of a micro pump are in a closed state according to an embodiment of this application.
Figure 6B:
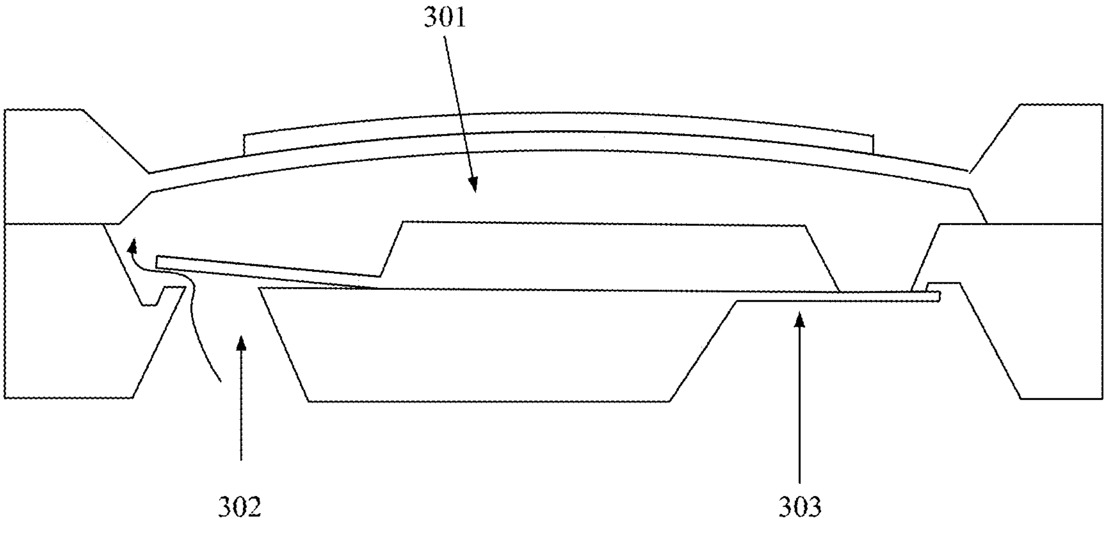
FIG. 6*b* is a schematic diagram of a structure in which a first communication port of a micro pump is in an open state and a second communication port thereof is in a closed state according to an embodiment of this application.
Figure 6C:
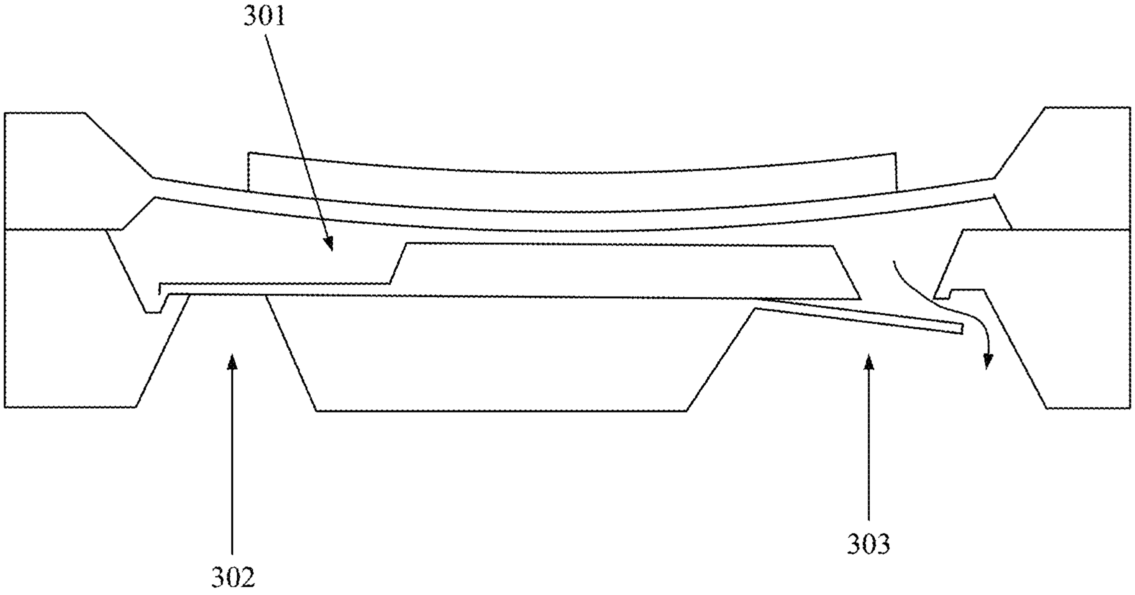
FIG. 6*c* is a schematic diagram of a structure in which a first communication port of a micro pump is in a closed state and a second communication port thereof is in an open state according to an embodiment of this application.

Referring to FIG. 3, FIG. 4, and FIG. 5, the gas detection module provided in this embodiment of this application includes: a fixed seat 1, a gas sensor 2, and a micro pump 3, where the gas sensor 2 has a detection chamber. Referring to FIG. 6*a*, FIG. 6*b*, and FIG. 6*c*, the micro pump 3 has a pump chamber 301 and a first communication port 302 and a second communication port 303 that are in communication with the pump chamber 301. The gas sensor 2 and the micro pump 3 are arranged side by side on the fixed seat 1, the fixed seat 1 is provided with a first fluid port 101 and a second fluid port 102 that are both in communication with the outside of the fixed seat 1, the first fluid port 101 is in communication with the detection chamber, and the second fluid port 102 is in communication with the second communication port. A flow channel 103 is further formed on the fixed seat 1, one end of the flow channel 103 is in communication with the first fluid port 101, and the other end thereof is in communication with the first communication port.

It should be noted that the micro pump may also be referred to as a micro fluid brake, and the pump chamber may also be referred to as a brake chamber.

The micro pump is a membrane actuator having a vibration exciting plate that can vibrate, and the vibration exciting plate may be made of one of a piezoelectric material, a magnetostriction material, and a shape memory alloy material.

The gas sensor can detect one or a combination of more of components such as carbon monoxide (CO), carbon dioxide ($CO_2$), nitrogen (N), nitrous oxide ($N_2O$), and volatile organic compounds (VOCs). The gas component and concentration detected by the gas sensor are not limited in this application.

A working process of the gas detection module is as follows: When the first fluid port is a gas inlet and the second fluid port is a gas outlet, the micro pump 3 is turned on, and external gas enters the detection chamber of the gas sensor 2 through the gas inlet under the action of the micro pump 3. The gas sensor 2 detects the gas introduced into the detection chamber. Meanwhile, the micro pump 3 also discharges original gas in the gas detection module through the second fluid port. After the detection by the gas sensor 2 is completed, the micro pump 3 is turned off.

It can be seen from the working process of the gas detection module that, when the first fluid port is the gas inlet, in a suction process of the micro pump, the external gas is introduced into the detection chamber through the first fluid port, and in a discharge process of the micro pump, the gas originally stored in the gas detection module can be discharged from the second fluid port. That is, the first fluid port has a gas inlet function, and the second fluid port has a gas outlet function. However, in an existing solution in which the first fluid port and the second fluid port are combined into one port (the port is named as a gas inlet and outlet), in the suction process of the micro pump, the external gas is introduced into the detection chamber through the gas inlet and outlet, in the discharge process of the micro pump, the gas originally stored in the gas detection module and a part of the gas just introduced into the detection chamber can be discharged from the gas inlet and outlet, and in a next suction process of the micro pump, the discharged gas originally stored in the gas detection module may be introduced into the detection chamber through the gas inlet and outlet again, resulting in reduction of the detection accuracy. To ensure the detection accuracy, in the conventional technology, a volume of the pump chamber of the micro pump may be relatively large, so as to ensure the detection accuracy.

Therefore, compared with an existing gas detection module, the gas detection module provided in this embodiment of this application significantly reduces a size of the entire gas detection module when the detection accuracy is similar. It may also be understood that, when the sizes are similar, the detection accuracy of the gas detection module provided in this embodiment of this application is significantly higher than that of the existing gas detection module.

In addition, because the gas sensor and the micro pump are integrated on the fixed seat, and the first fluid port, the second fluid port, and the flow channel are provided on the fixed seat, the entire gas detection module has a compact structure and a relatively small size, and is also convenient in mounting.

To improve detection efficiency, referring to FIG. 3 and FIG. 4, a mounting chamber 104 is formed on the fixed seat 1, the gas sensor 2 is located in the mounting chamber 104 and positions at which the gas sensor 2 is in contact with the mounting chamber 104 are all hermetically connected, the mounting chamber 104 is in communication with the first fluid port 101, and the flow channel 103 is in communication with the mounting chamber 104.

That is, the gas sensor is hermetically disposed in the mounting chamber. In a gas detection process, a flow rate is very small, only at a ul/min level, or at an ml/min level. Therefore, through a hermetical connection, a phenomenon of gas leakage can be avoided, so as to improve the detection efficiency.

In addition, positions at which the micro pump 3 is in contact with the fixed seat are also hermetically connected. Therefore, the detection efficiency is further improved.

The micro pump 3 has the following two embodiments. First embodiment: The micro pump is a unidirectional micro pump. Second embodiment: The micro pump is a bidirectional micro pump.

When the micro pump is the unidirectional micro pump (a unidirectional pump is shown in FIG. 6*a*, FIG. 6*b*, and FIG. 6*c*), the first fluid port is a gas inlet, and the second fluid port is a gas outlet.

When the micro pump is the bidirectional micro pump, there are two application scenarios: One is that the first fluid port is the gas inlet, and the second fluid port is the gas outlet; and the other is that the first fluid port is the gas outlet, and the second fluid port is the gas inlet.

Compared with the unidirectional micro pump, the bidirectional micro pump has the following technical effects: If the first fluid port as the gas inlet is blocked, or the flow channel is blocked, or the second fluid port as the gas outlet is blocked, the second fluid port is used as the gas inlet, and the first fluid port is used as the gas outlet, so as to change a flow direction of a gas flow, thereby facilitating discharging of a blocking substance, and improving use performance of the gas detection module.

The bidirectional micro pump may adopt the following two structures of micro pumps. One type is a valve pump, that is, the flow direction of the gas flow is controlled by using a valve. The other type is a valveless pump, that is, the flow direction of the gas flow is changed through a difference between flow rates of fluid in the first fluid port and the second fluid port. For example, when the flow rate of the fluid in the first fluid port is greater than the flow rate of the fluid in the second fluid port, the first fluid port is the gas inlet, and the second fluid port is the gas outlet. Conversely, when the flow rate of the fluid in the second fluid port is greater than the flow rate of the fluid in the first fluid port, the second fluid port is the gas inlet, and the first fluid port is the gas outlet.

When the first fluid port is the gas inlet, to introduce gas outside the mobile terminal into the first fluid port, a first gas hole is provided on a housing of the mobile terminal, and the first gas hole is in communication with the first fluid port.

When the second fluid port is the gas inlet, to introduce the gas outside the mobile terminal into the second fluid port, a second gas hole is provided on the housing of the mobile terminal, and the second gas hole is in communication with the second fluid port.

To improve an artistic appearance of the mobile terminal, a microphone hole provided on the housing may be directly used as the first gas hole or the second gas hole, or both the first gas hole and the second gas hole may be microphone holes, thereby reducing a quantity of holes provided on the housing and improving the artistic appearance.

Figure 7:
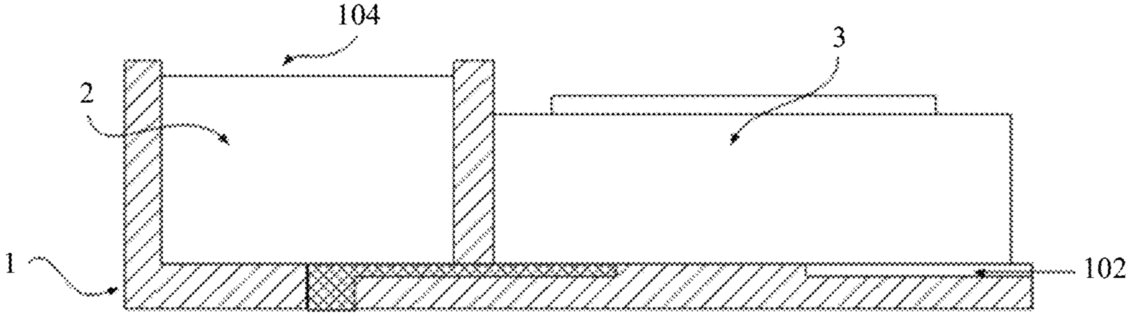
FIG. 7 is a schematic diagram of a structure for reflecting a volume of a flow channel between a first fluid port and a first communication port according to an embodiment of this application.

To further improve the detection accuracy and improve a detection effect, a volume of the flow channel between the first fluid port and the first communication port is $Vs_1$, and $$Vs_1 \leq \frac{Vm}{Fg},$$

where Vm is a flow rate of the micro pump, and Fg is a detection frequency of the gas sensor. A structure with grids filled with lines shown in FIG. 7 is the volume $Vs_1$ of the flow channel between the first fluid port and the first communication port. Generally, a unit of Vm is ul/min or ml/min and a unit of Fg is Hz. When the unit of Vm is ul/min, a unit of $Vs_1$ is ul, and when the unit of Vm is ml/min, a unit of $Vs_1$ is ml. The technical solution is applicable to a scenario in which the first fluid port is the gas inlet, and the second fluid port is the gas outlet, that is, a scenario in which the gas sensor is located upstream, and the micro pump is located downstream.

That is, when the gas sensor performs detection once, the gas in the detection chamber of the gas sensor is replaced at least once, thereby further improving the detection accuracy. In addition, $$Vs_1 \leq \frac{Vm}{Fg}$$

is a preferred technical solution of this application, and $$Vs_1 > \frac{Vm}{Fg}$$

also falls within the protection scope of this application.

In some implementations, a sum of a volume between the second fluid port and the second communication port, a volume of the pump chamber, and a volume of a flow channel between the first communication port and an inlet of the detection chamber of the gas sensor is $Vs_2$, and $$Vs_2 \leq \frac{Vm}{Fg},$$

where Vm is the flow rate of the micro pump, and Fg is the detection frequency of the gas sensor. The technical solution is applicable to a scenario in which the second fluid port is the gas inlet, and the first fluid port is the gas outlet, that is, a scenario in which the micro pump is located upstream, and the gas sensor is located downstream.

That is, when the gas sensor performs detection once, the gas in the detection chamber of the gas sensor is replaced at least once, thereby further improving the detection accuracy. In addition, $$Vs_2 \leq \frac{Vm}{Fg}$$

is a preferred technical solution of this application, and $$Vs_2 > \frac{Vm}{Fg}$$

also falls within the protection scope of this application.

In some embodiments, gas entering the first fluid port 101 may be doped with liquid, and the liquid also flows through the first fluid port 101 with the gas and enters the gas sensor 2 and the micro pump 3 simultaneously. This affects the detection accuracy, and the liquid causes damage to the gas sensor.

Figure 8:
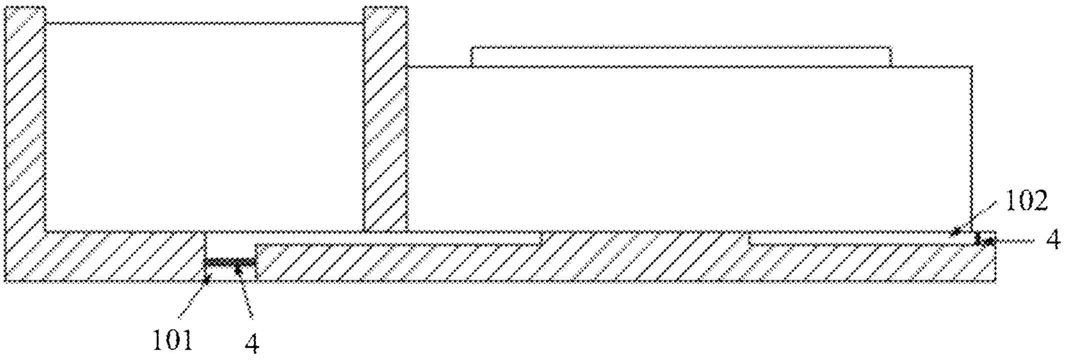
FIG. 8 is a schematic diagram of a structure of a gas detection module including a gas-permeable filtering element according to an embodiment of this application.

Therefore, to ensure the use performance of the gas detection module, referring to FIG. 8, a gas-permeable filtering element 4 is disposed in the first fluid port 101, and the gas-permeable filtering element 4 is configured to filter the liquid in the gas sucked into the first fluid port 101.

Certainly, when the second fluid port is the gas inlet, gas entering the second fluid port 102 may be doped with liquid, and the liquid also flows through the second fluid port 102 with the gas and enters the micro pump 3 and the gas sensor 2 simultaneously. Therefore, to ensure the use performance of the gas detection module, referring to FIG. 8, the gas-permeable filtering element 4 is disposed in the second fluid port 102, and the gas-permeable filtering element 4 is configured to filter the liquid in the gas sucked into the second fluid port 102.

It should be noted that the gas-permeable filtering element 4 may be disposed in both the first fluid port and the second fluid port.

The gas-permeable filtering element 4 may be an activated carbon filter, a hydrophobic filter, an electrostatic filter, or a Teflon filter, or may be a waterproof gas-permeable membrane. In this application, the waterproof gas-permeable membrane is preferred used as the gas-permeable filtering element 4. The waterproof gas-permeable membrane has a simple structure and occupies a small space, and the waterproof gas-permeable membrane can further diffuse a gas flow, so that the gas flow flows evenly into the detection chamber of the gas sensor, thereby improving stability of gas detection. In addition, the waterproof gas-permeable membrane also has a dust-proof effect to prevent dust from entering the detection chamber, so as to further improve the use performance of the gas detection module.

In some application scenarios, after the micro pump is turned on, and gas enters the detection chamber of the gas sensor, the micro pump may be turned off, and the gas sensor detects the introduced gas.

In this scenario, to allow a sufficient amount of gas to be introduced into the gas detection module and to ensure the detection efficiency, referring to FIG. 4, the fixed seat 1 has a side wall (a wall surface M shown in FIG. 3) opposite to a gas inlet of the detection chamber, and the first fluid port 101 is provided on the side wall. A reservoir chamber 105 that is in communication with the first fluid port 101 is formed on the wall surface that is of the side wall and that is opposite to the gas inlet of the detection chamber, and the reservoir chamber 105 is in communication with the detection chamber 104. That is, some detected gas is stored in the reservoir chamber 105, and the detection efficiency is significantly improved compared with a solution in which the reservoir chamber is not provided.

A structure of the reservoir chamber 105 is not limited in this application, and any shape falls within the protection scope of this application.

After the fixed seat on which the gas sensor and the micro pump are mounted is mounted in the housing of the mobile terminal, the fixed seat may be electrically connected to a main control board, so that the main control board controls actions of the gas sensor and the micro pump.

Figure 9:
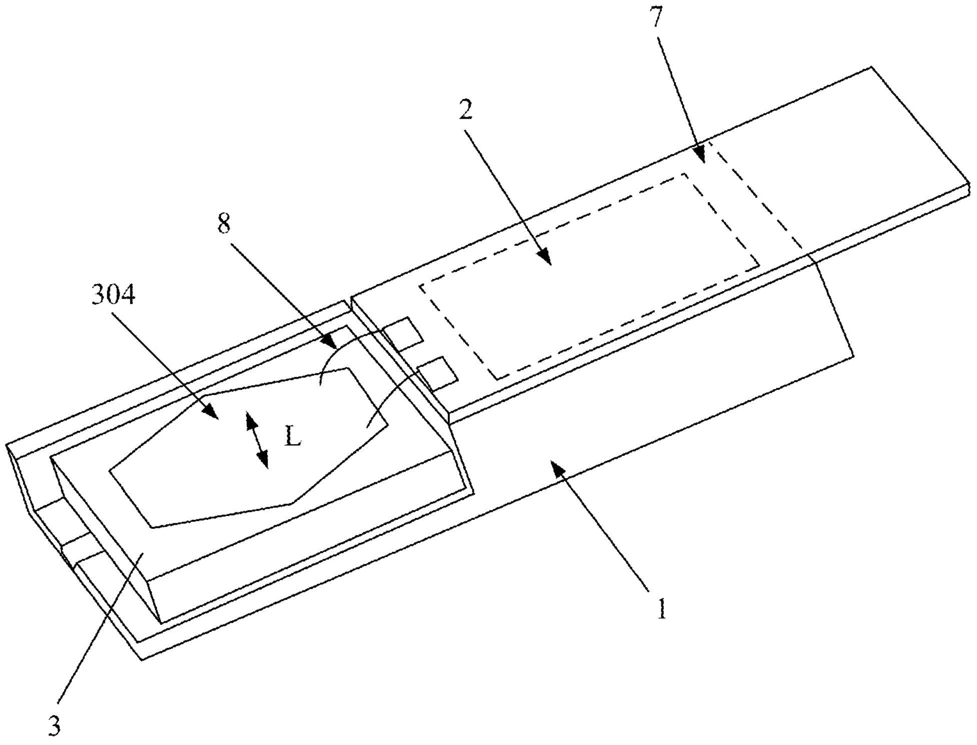
FIG. 9 is a schematic diagram of a structure of a gas detection module including a circuit board according to an embodiment of this application.

To facilitate electrical connection of both the gas sensor and the micro pump to the main control board, referring to FIG. 9, the gas detection module further includes a circuit board 7, where the circuit board 7 is configured to be electrically connected to the main control board in the mobile terminal, the circuit board 7 is disposed on one side of the gas sensor, and the circuit board 7 is electrically connected to the gas sensor 2 and is electrically connected to the micro pump 3. In addition, alternatively, the gas sensor and the micro pump may be directly electrically connected to the main control board without providing the circuit board.

The circuit board is disposed on one side of the gas sensor of the fixed seat, and the circuit board is electrically connected to the gas sensor and the micro pump, so that the circuit board, the fixed seat, the gas sensor, and the micro pump form one module. During exemplary mounting, the module is mounted in the housing. Then, the circuit board is connected to the main control board, and the main control board may not be electrically connected to the gas sensor and the micro pump by a signal line. Therefore, in this application, assembly efficiency is effectively improved.

As shown in FIG. 9, a first pin electrically connected to the gas sensor and a second pin electrically connected to the micro pump are disposed on the circuit board, where the first pin is welded to the gas sensor, and the second pin is electrically connected to the micro pump 3 by using a signal line 8.

Certainly, the circuit board may be alternatively electrically connected to the gas sensor and the micro pump in another connection manner. A connection structure between the circuit board and the gas sensor and a connection structure between the circuit board and the micro pump are not limited in this application, and any connection structure falls within the protection scope of this application.

In this application, the circuit board is disposed on one side of the gas sensor of the fixed seat rather than on one side of the micro pump. The purpose of this design is that, referring to FIG. 9, because the micro pump 3 includes the vibration exciting plate 304, when an electrical signal is loaded to the vibration exciting plate 304, the vibration exciting plate 304 vibrates to change the volume of the pump chamber, and the vibration exciting plate 304 vibrates in a direction L shown in FIG. 9 (i.e., vibrates in a height direction of the gas detection module). If the circuit board 7 is mounted above the micro pump 3, the vibration exciting plate 304 may interfere with the circuit board 7 during vibration, affecting operation of the micro pump 3, and an exemplary distance may be provided between the circuit board 7 and the vibration exciting plate 304, to prevent interference between the circuit board and the vibration exciting plate, but this increases a size of the gas detection module. Therefore, in this application, the circuit board is disposed on one side of the gas sensor.

In some implementations, the fixed seat 1 is made of a metal material, and compared with a plastic material or the like, fewer types of impurity gas are released by the metal fixed seat and the impurity gas has lower content, while more types of impurity gas are released by a plastic fixed seat and the impurity gas has higher content. Consequently, more released impurity gas affects the detection accuracy.

For example, when the gas detection module is configured to detect content of formaldehyde in a child crawling pad, if plastic is used for the fixed seat, the fixed seat releases an exemplary amount of formaldehyde. As a result, the measured formaldehyde content on the crawling pad is inaccurate, and the use performance of the gas detection module is reduced.

In some implementations, both the gas sensor 2 and the micro pump 3 are mounted on the fixed seat 1 by using sealant layers. Compared with a welding structure, the sealant layer has the advantages that when the welding structure is used, first, a welding temperature is relatively high in a welding process, and for a gas detection module with a small size, a component such as the micro pump or the gas sensor may be damaged; and second, because sealing performance of the welding structure is far lower than that of the sealant layer, the welding structure also affects the detection efficiency.

It should be noted that fewer types of gas are released by the sealant layer designed in this application, and the impurity gas has lower content, thereby reducing the impact on the detection accuracy.

The fixed seat 1 may alternatively be connected to the housing of the mobile terminal by using the sealant layer, which is convenient for mounting and also avoids the phenomenon of releasing excessive impurity gas to affect the detection accuracy.

The gas sensor provided in this embodiment of this application may be a single-channel gas sensor, or may be a multi-channel gas sensor. The single-channel gas sensor refers to a gas sensor that can detect one type of gas, for example, detect whether an exemplary type of gas is contained or detect a concentration of an exemplary type of gas, and the multi-channel gas sensor refers to a gas sensor that can detect a plurality of types of gas simultaneously, for example, detect an odor map.

To further improve the use performance of the gas detection module, there are a plurality of gas sensors in the gas detection module. For example, the gas sensors include a first gas sensor, a second gas sensor, and a third gas sensor, the first gas sensor is configured to detect a concentration of formaldehyde, the second gas sensor is configured to detect a concentration of carbon monoxide, and the third gas sensor is configured to detect a concentration of sulfide. A quantity of gas sensors is not limited in this application.

The plurality of gas sensors may be arranged in parallel, or the plurality of gas sensors may be arranged in series.

When the plurality of gas sensors are arranged in parallel, that is, a detection chamber of each gas sensor is in communication with the first fluid port. There may be one or more micro pumps, and the plurality of micro pumps are arranged in a one-to-one correspondence with the plurality of gas sensors.

When the plurality of gas sensors are arranged in series, that is, a detection chamber of one of gas sensors, located at two ends, of the plurality of gas sensors is in communication with the first fluid port, and the other one of the gas sensors, located at the two ends, of the plurality of gas sensors is in communication with the micro pump.

A structure of the fixed seat 1 has a plurality of cases. A structure may be determined based on a space reserved for the gas detection module in the housing of the mobile terminal. Therefore, the structure of the fixed seat is not limited in this application.

As shown in FIG. 4, an embodiment of this application provides a structure of a fixed seat. The fixed seat 1 includes a bottom board 11 and a separation board 12. The bottom board 11 has a first surface (surface F1 shown in FIG. 4) and a second surface (surface F2 shown in FIG. 4) that are opposite to each other. The separation board 12 is disposed at the middle of the first surface, so that the bottom board 11 forms a first side located on one side of the separation board 12 and a second side located on the other side of the separation board 12. The first fluid port 101 is provided on the first side, the second fluid port 102 is provided on the second side, and the flow channel 103 is provided on the first surface and extends from the first side to the second side. The gas sensor is disposed on the first side, and the micro pump is disposed on the second side. The fixed seat has a simple and compact structure and occupies a relatively small space.

In the fixed seat of the structure, the first fluid port is provided on the bottom board, and because an inlet of the detection chamber of the gas sensor is opposite to the bottom board, the first fluid port is provided on the bottom board. Certainly, the first fluid port may be alternatively provided at another position, which may be determined based on a position of the inlet of the detection chamber of the gas sensor.

In the fixed seat of the structure, the second fluid port is also provided on the bottom board, and an extending direction of the second fluid port is parallel to the bottom board. Certainly, a length direction of the second fluid port may be alternatively perpendicular to the bottom board, or may have an angle of another size with the bottom board.

As shown in FIG. 4, a fluid groove is formed on the first surface of the second side, the fluid groove extends to an outer edge of the second side, and the fluid groove forms the second fluid port 102. The fluid groove is provided on the first surface of the second side, so that the fluid groove forms the second fluid port, and a structure and a manufacturing process are simple.

Referring to FIG. 4, the fixed seat 1 further includes an enclosure board 13. The enclosure board 13 is disposed on the first side and encloses the mounting chamber 104 with the separation board 12, where the gas sensor is disposed in the mounting chamber 104 and the positions at which the gas sensor is in contact with the mounting chamber are connected by using a sealant layer, the mounting chamber 104 is in communication with the first fluid port 101, and an end portion of the flow channel 103 extending to the first side is in communication with the mounting chamber 104. The gas sensor is hermetically connected to the mounting chamber, so that the detection efficiency can be improved, and the phenomenon of gas leakage can be avoided.

It can be seen from FIG. 4 that, the flow channel 103 extends from the first side to the second side along an edge of the bottom board 11, and the advantage of this design is that a vertical projection of the inlet of the detection chamber of the gas sensor on the bottom board is close to the edge of the bottom board, and a vertical projection of the first communication port of the micro pump on the bottom board is also close to the edge of the bottom board, so that the flow channel is provided close to the edge of the bottom board, the manufacturing process is simple, and correspondingly, a size of the entire gas detection module is not increased due to the disposing of the flow channel.

Because the micro pump includes the vibration exciting plate, the vibration exciting plate is capable of vibrating when an electrical signal is loaded to the vibration exciting plate. After the gas detection module is mounted in the housing of the mobile terminal, to prevent interference between another structure and the vibration exciting plate, the enclosure board and a surface of the separation board away from the first surface are higher than a surface of the vibration exciting plate 304. In other words, a space is reserved for vibration of the vibration exciting plate to prevent interference between another structure and the vibration exciting plate.

In addition, it can be seen from FIG. 4 that the micro pump 3 is not located in an enclosed chamber, and the advantage of this design is that the micro pump 3 vibrates when an electrical signal is loaded, and the micro pump has a relatively large degree of freedom without the enclosure board provided around, to prevent interference with the enclosure board, affecting performance of the micro pump 3.

Referring to FIG. 4, K1 shown in FIG. 4 is a first opening groove provided on the bottom board 11 and opposite to the first communication port of the micro pump, and the first opening groove K1 is in communication with the flow channel 103. K2 shown in FIG. 4 is a second opening groove provided on the bottom board 11 and opposite to the second communication port of the micro pump, and the second opening groove K2 is in communication with the second fluid port 102.

A position where the first opening groove K1 is provided on the bottom board is related to a position of the first communication port of the micro pump. When the position of the first communication port of the micro pump changes, the position where the first opening groove K1 is provided also changes. Similarly, a position where the second opening groove K2 is provided on the bottom board is related to a position of the second communication port of the micro pump. When the position of the second communication port of the micro pump changes, the position where the second opening groove K2 is provided also changes.

Shapes of the first opening groove K1 and the second opening groove K2 are not limited in this application, so as to ensure that the first opening groove K1 is opposite to the first communication port, and to avoid leakage of fluid at a position where the first opening groove K1 is opposite to the first communication port as far as possible. It is also ensured that the second opening groove K2 is opposite to the second communication port, and leakage of fluid at a position where the second opening groove K2 is opposite to the second communication port is avoided as far as possible.

Figure 10:
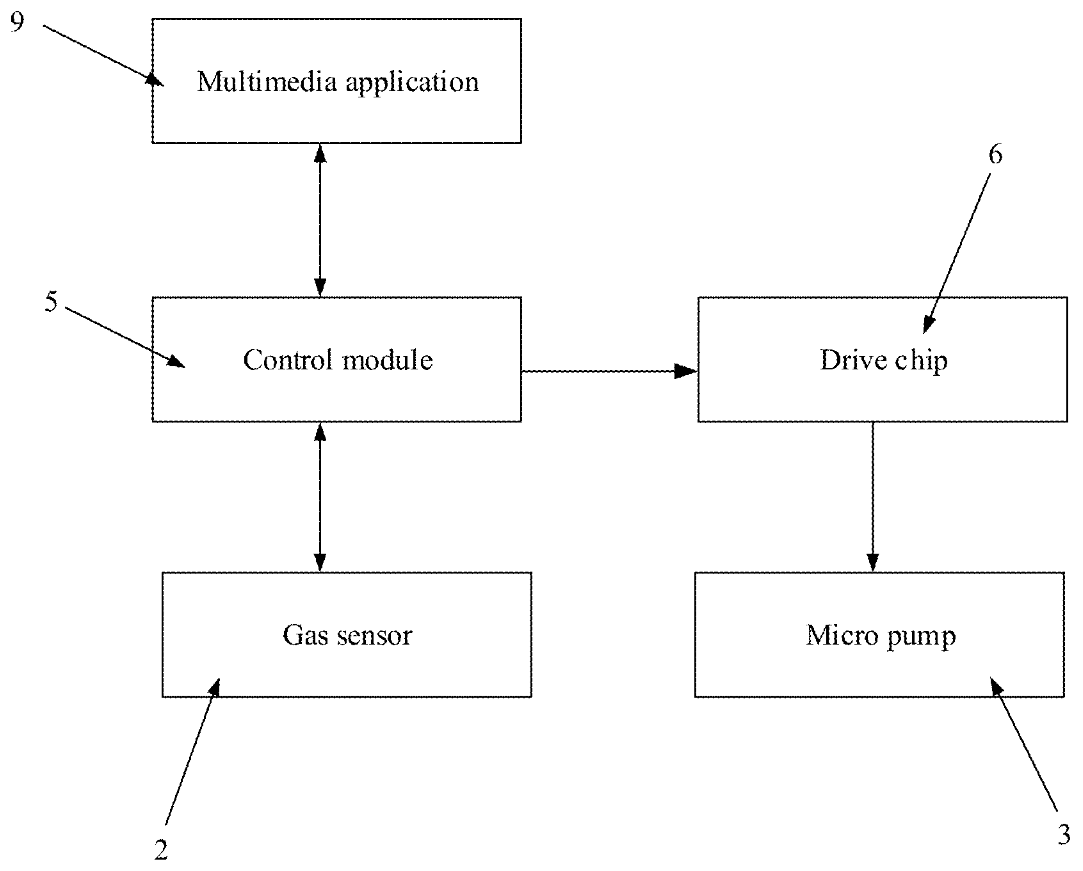
FIG. 10 is a schematic diagram of a circuit connection relationship among a control module, a drive chip, a gas sensor, a micro pump, and a multimedia application according to an embodiment of this application.

In some implementations, referring to FIG. 10, the gas detection module further includes a control module 5 and a drive chip 6. The control module 5 is electrically connected to the gas sensor 2. The drive chip 6 is electrically connected to the micro pump 3, and is configured to load an electrical signal to the vibration exciting plate of the micro pump, and the drive chip 6 is electrically connected to the control module 5. That is, the control module 5 controls the drive chip 6 to control the electrical signal loaded on the vibration exciting plate of the micro pump, changes the loaded electrical signal, to finally change a working frequency and a flow rate of the micro pump, and the control module 5 controls a frequency of the gas sensor 2 to change the frequency of the gas sensor 2, so that the gas detection module is applied to different scenarios. The control module 5 and the drive chip 6 may be integrated on the main control board of the mobile terminal.

To facilitate an operation of a user, a multimedia application 9 (App) for gas detection may be displayed on an operation interface of the mobile terminal, and the multimedia application 9 is electrically connected to the control module 5.

The following describes detection methods in two application scenarios of the gas detection module.

First, in a dynamic detection scenario, the gas detection module is configured to detect gas.

Figure 11:
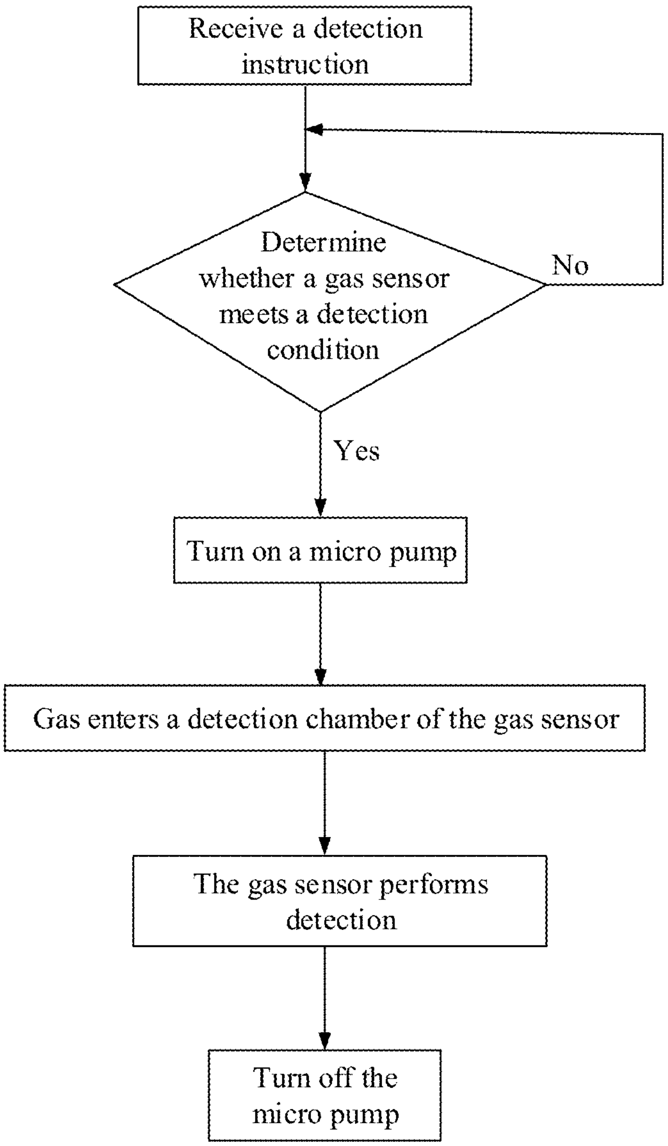
FIG. 11 is a flowchart block diagram of a detection method for a gas detection module in a dynamic detection scenario according to an embodiment of this application.

Referring to FIG. 11, the detection method for the gas detection module includes the following steps:

Receive a detection instruction.

Determine whether a gas sensor meets a detection condition. After the gas sensor is started, the gas sensor is preheated first, so that the gas sensor reaches a gas detection condition. Because a gas detection process belongs to a chemical reaction, detection accuracy can be ensured only when a proper reaction condition is provided. After the gas sensor meets the detection condition, a next step is performed.

Turn on a micro pump. After the micro pump is turned on, a suction process and a discharge process are switched continuously.

Gas enters a detection chamber of the gas sensor. That is, in a process in which the suction process and the discharge process of the micro pump are continuously switched, external gas enters the detection chamber of the gas sensor.

The gas sensor performs detection. That is, the gas entering the detection chamber is detected by using the gas sensor.

Turn off the micro pump. That is, after the gas detection is completed, the micro pump is turned off.

The dynamic detection scenario is applicable to a scenario that may require a relatively fast response. For example, a user detects exhaled gas, a detection time is short, and external gas can continuously enter the detection chamber of the gas sensor after the micro pump is turned on, so that the gas sensor continuously performs detection.

Figure 12:
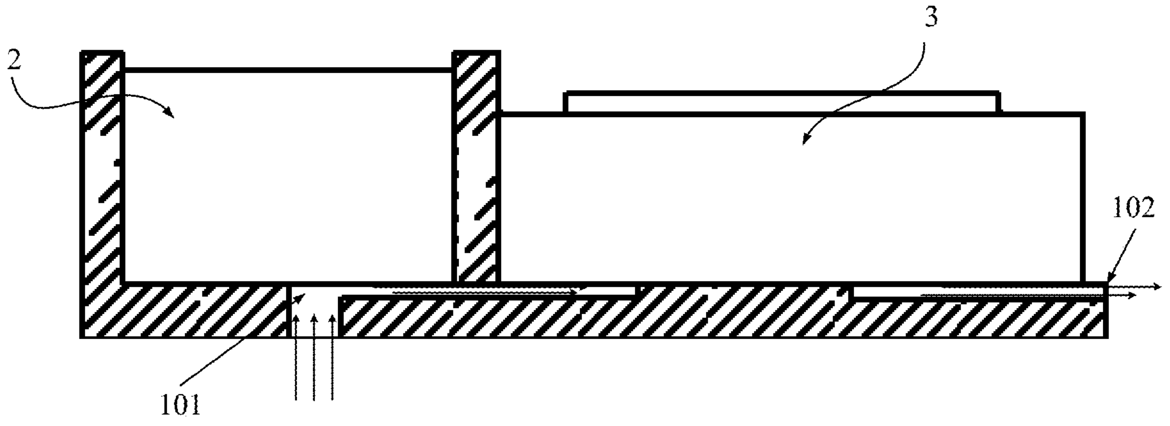
FIG. 12 is a working state diagram of a gas detection module in a dynamic detection scenario according to an embodiment of this application.
Figure 13:
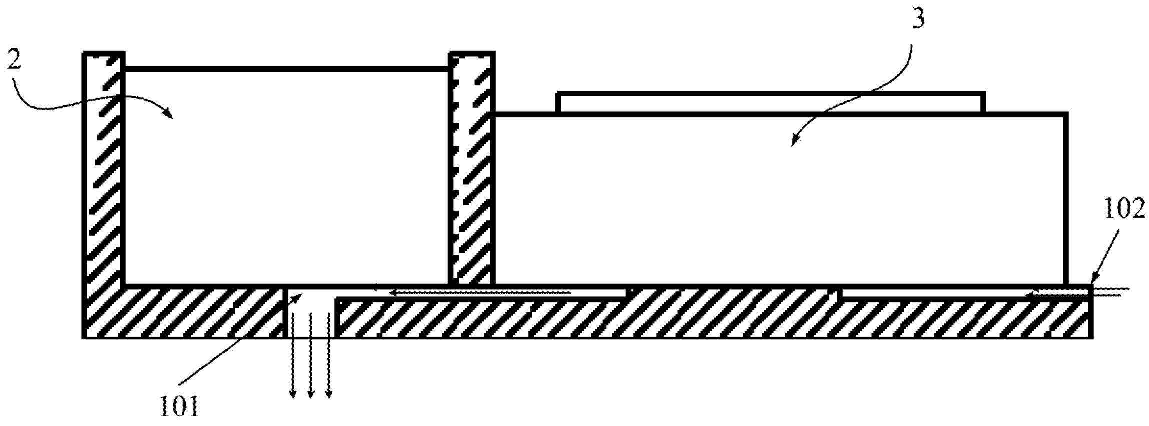
FIG. 13 is another working state diagram of a gas detection module in a dynamic detection scenario according to an embodiment of this application.

In the dynamic detection scenario, referring to FIG. 12, lines with arrows in FIG. 12 represent a flow direction of fluid, that is, the first fluid port 101 is a gas inlet, and the second fluid port 102 is a gas outlet. That is, the gas sensor is located upstream, and the micro pump is located downstream. In addition, in another embodiment, referring to FIG. 13, lines with arrows in FIG. 13 represent a flow direction of fluid, that is, the second fluid port 102 is the gas inlet, and the first fluid port 101 is the gas outlet. That is, the micro pump is located upstream, and the gas sensor is located downstream.

Second, in a static detection scenario, the gas detection module is configured to detect gas.

Figure 14:
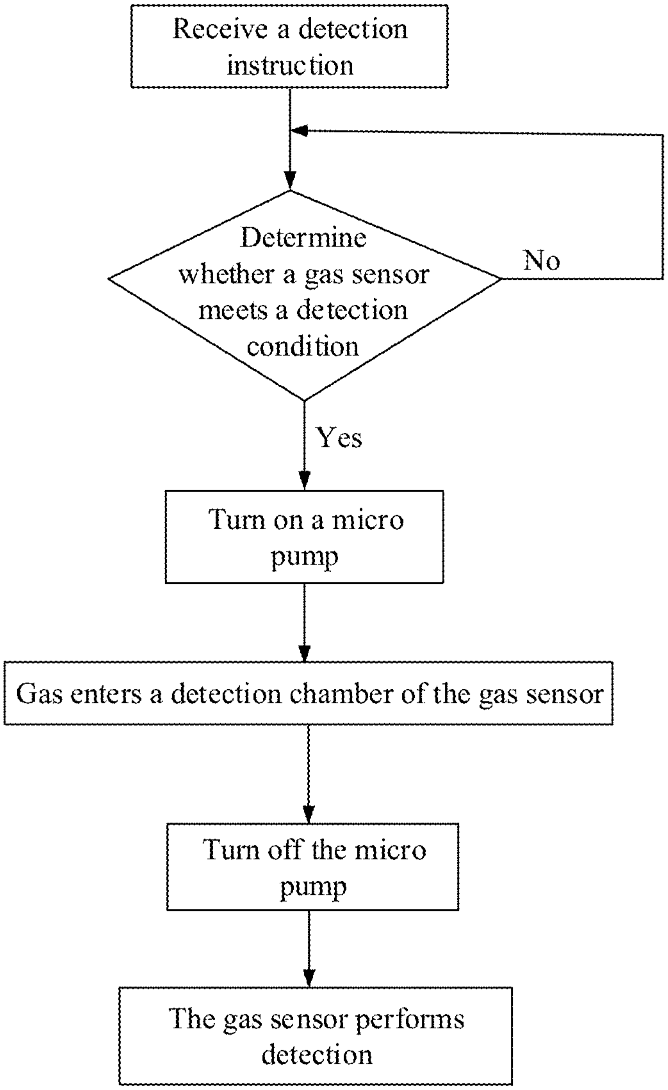
FIG. 14 is a flowchart block diagram of a detection method for a gas detection module in a static detection scenario according to an embodiment of this application.

Referring to FIG. 14, the detection method for the gas detection module includes the following steps:

Receive a detection instruction.

Determine whether a gas sensor meets a detection condition. After the gas sensor is started, the gas sensor is preheated first, so that the gas sensor reaches a gas detection condition. Because a gas detection process belongs to a chemical reaction, detection accuracy can be ensured only when a proper reaction condition is provided. After the gas sensor meets the detection condition, a next step is performed.

Turn on a micro pump. After the micro pump is turned on, a suction process and a discharge process are switched continuously.

Gas enters a detection chamber of the gas sensor. That is, in a process in which the suction process and the discharge process of the micro pump are continuously switched, external gas enters the detection chamber of the gas sensor.

Turn off the micro pump. That is, after the gas enters the detection chamber of the gas sensor, the micro pump may be turned off.

The gas sensor performs detection. After the micro pump is turned off, the gas entering the detection chamber is then detected by using the gas sensor.

A difference between the detection method in the static detection scenario shown in FIG. 14 and the detection method in the dynamic detection scenario shown in FIG. 11 is that in FIG. 11, after the gas detection is completed, the micro pump is turned off; but in FIG. 14, after the micro pump is turned off, the gas detection is performed.

The static detection scenario is applicable to a scenario that may require a relatively slow response time. For example, indoor air quality is detected, a requirement on a detection response is not high, and the micro pump can be turned off after the micro pump is turned on for a period of time and external gas enters the detection chamber of the gas sensor. Then, the gas sensor is configured to perform detection.

Figure 15:
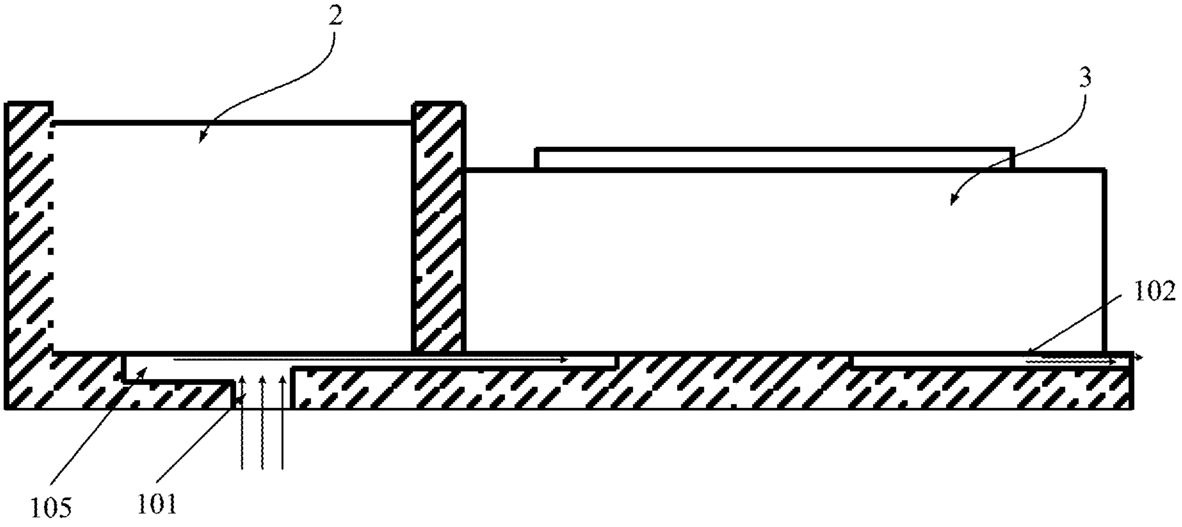
FIG. 15 is a working state diagram of a gas detection module in a static detection scenario according to an embodiment of this application.
Figure 16:
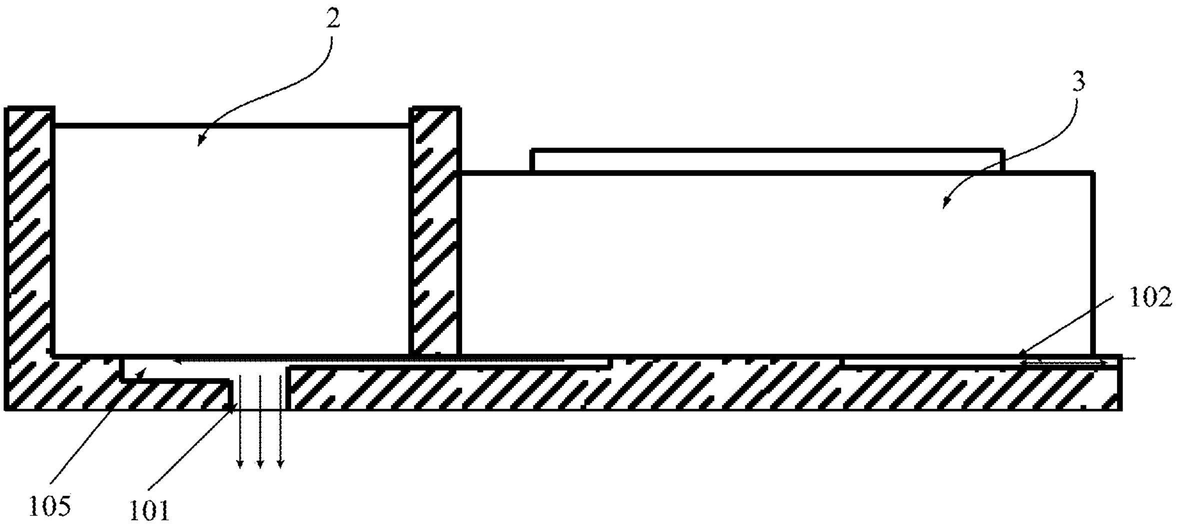
FIG. 16 is another working state diagram of a gas detection module in a static detection scenario according to an embodiment of this application.

In the static detection scenario, referring to FIG. 15 and FIG. 16, a difference between a structure of the gas detection module and that of the gas detection module shown in FIG. 12 and FIG. 13 is that the gas detection module further includes a reservoir chamber 105, and an exemplary amount of gas can be stored in the reservoir chamber 105, so that the gas detection module can still ensure the detection accuracy in the static detection scenario.

Referring to FIG. 15, lines with arrows in FIG. 15 represent a flow direction of fluid, that is, the first fluid port 101 is the gas inlet, and the second fluid port 102 is the gas outlet. That is, the gas sensor is located upstream, and the micro pump is located downstream. In addition, in another embodiment, referring to FIG. 16, lines with arrows in FIG. 16 represents a flow direction of fluid, that is, the second fluid port 102 is the gas inlet, and the first fluid port 101 is the gas outlet. That is, the micro pump is located upstream, and the gas sensor is located downstream.

In the descriptions of this specification, the described exemplary features, structures, materials, or characteristics may be combined in a proper manner in any one or more of the embodiments or examples.

The foregoing descriptions are merely exemplary implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A gas detection module, comprising:

a gas sensor, the gas sensor comprising a detection chamber;

a micro pump, the micro pump comprising a pump chamber, a first communication port, and a second communication port, the first communication port and the second communication port being in communication with the pump chamber; and a fixed seat, wherein the gas sensor and the micro pump are arranged side by side on the fixed seat, wherein the fixed seat is provided with a first fluid port and a second fluid port, wherein the first fluid port and the second fluid port are both in communication with the outside of the fixed seat, the first fluid port is in communication with the detection chamber, and the second fluid port is in communication with the second communication port, wherein a flow channel is formed on the fixed seat, one end of the flow channel is in communication with the first fluid port, and the other end thereof is in communication with the first communication port; and wherein a volume of the flow channel between the first fluid port and the first communication port is $Vs_1$, and $$Vs_1 \leq \frac{Vm}{Fg},$$

wherein Vm is a flow rate of the micro pump, and Fg is a detection frequency of the gas sensor.

2. The gas detection module according to claim 1, wherein a mounting chamber is formed in the fixed seat, the gas sensor is located in the mounting chamber, positions at which the gas sensor is in contact with the mounting chamber are all hermetically connected, the mounting chamber is in communication with the first fluid port, and the flow channel is in communication with the mounting chamber.

3. The gas detection module according to claim 1, wherein a gas-permeable filtering element is disposed in the first fluid port and/or the second fluid port, and the gas-permeable filtering element is configured to filter liquid in gas sucked into the first fluid port and/or the second fluid port.

4. The gas detection module according to claim 1, further comprising:

a circuit board configured to be electrically connected to a main control board in a mobile terminal, wherein the circuit board is disposed on one side of the gas sensor, and the circuit board is electrically connected to the gas sensor and is electrically connected to the micro pump.

5. The gas detection module according to claim 1, wherein the fixed seat comprises a side wall opposite to a gas inlet of the detection chamber, the first fluid port is provided on the side wall, a reservoir chamber in communication with the first fluid port is formed on a wall surface that is of the side wall and that is opposite to the gas inlet of the detection chamber, and the reservoir chamber is in communication with the detection chamber.

6. The gas detection module according to claim 1, wherein the micro pump is a unidirectional micro pump or a bidirectional micro pump.

7. The gas detection module according to claim 1, wherein the fixed seat comprises:

a bottom board, having a first surface and a second surface that are opposite to each other; and a separation board, disposed at the middle of the first surface, wherein the bottom board forms a first side located on a first side of the separation board and a second side located on a second side of the separation board, wherein the first fluid port is provided on the first side, the second fluid port is provided on the second side, the flow channel is provided on the first surface and extends from the first side to the second side, the gas sensor is disposed on the first side, and the micro pump is disposed on the second side.

8. The gas detection module according to claim 7, wherein the fixed seat further comprises:

an enclosure board, disposed on the first side and enclosing the mounting chamber with the separation board, wherein the gas sensor is disposed in the mounting chamber and the positions at which the gas sensor is in contact with the mounting chamber are all connected using a sealant layer, the mounting chamber is in communication with the first fluid port, and an end portion of the flow channel extending to the first side is in communication with the mounting chamber.

9. The gas detection module according to claim 8, wherein the micro pump comprises a vibration exciting plate, the vibration exciting plate is capable of vibrating when an electrical signal is loaded to the vibration exciting plate, the vibration exciting plate is located on one side of the micro pump away from the first surface, and the enclosure board and a surface of the separation board away from the first surface are higher than a surface of the vibration exciting plate.

10. The gas detection module according to claim 7, wherein a fluid groove is formed on the first surface of the second side, the fluid groove extends to an outer edge of the second side, and the fluid groove forms the second fluid port.

11. The gas detection module according to claim 1, further comprising:

a control module, electrically connected to the gas sensor; and a drive chip, electrically connected to the micro pump and configured to load an electrical signal to a vibration exciting plate of the micro pump, wherein the drive chip is electrically connected to the control module.

12. The gas detection module according to claim 1, wherein the fixed seat is composed of a metal material.

13. A mobile terminal, the mobile terminal comprising:

a housing; and a gas detection module, wherein the gas detection module is disposed in the housing, wherein a first gas hole and/or a second gas hole are/is provided on the housing, wherein the first gas hole is in communication with a first fluid port, and the second gas hole is in communication with a second fluid port, wherein the gas detection module comprises:

a gas sensor, the gas sensor comprising a detection chamber;

a micro pump, the micro pump comprising a pump chamber, a first communication port, and a second communication port, the first communication port and the second communication port being in communication with the pump chamber; and a fixed seat, wherein the gas sensor and the micro pump are arranged side by side on the fixed seat, wherein the fixed seat is provided with a first fluid port and a second fluid port, wherein the first fluid port and the second fluid port are both in communication with the outside of the fixed seat, the first fluid port is in communication with the detection chamber, and the second fluid port is in communication with the second communication port, wherein a flow channel is formed on the fixed seat, one end of the flow channel is in communication with the first fluid port, and the other end thereof is in communication with the first communication port; and wherein a volume of the flow channel between the first fluid port and the first communication port is $Vs_1$, and $$Vs_1 \leq \frac{Vm}{Fg},$$

wherein Vm is a flow rate of the micro pump, and Fg is a detection frequency of the gas sensor.

14. The mobile terminal according to claim 13, wherein a mounting chamber is formed in the fixed seat, the gas sensor is located in the mounting chamber, positions at which the gas sensor is in contact with the mounting chamber are all hermetically connected, the mounting chamber is in communication with the first fluid port, and the flow channel is in communication with the mounting chamber.

15. The mobile terminal according to claim 13, wherein a gas-permeable filtering element is disposed in the first fluid port and/or the second fluid port, and the gas- permeable filtering element is configured to filter liquid in gas sucked into the first fluid port and/or the second fluid port.

16. The mobile terminal according to claim 13, further comprising:

a circuit board configured to be electrically connected to a main control board in a mobile terminal, wherein the circuit board is disposed on one side of the gas sensor, and the circuit board is electrically connected to the gas sensor and is electrically connected to the micro pump.

17. The mobile terminal according to claim 13, wherein the fixed seat has a side wall opposite to a gas inlet of the detection chamber, the first fluid port is provided on the side wall, a reservoir chamber that is in communication with the first fluid port is formed on a wall surface that is of the side wall and that is opposite to the gas inlet of the detection chamber, and the reservoir chamber is in communication with the detection chamber.

18. The mobile terminal according to claim 13, wherein the first gas hole and/or the second gas hole are/is a microphone hole provided on the housing.

* * * * *